(12) United States Patent
Kraft

(10) Patent No.: US 12,404,188 B2
(45) Date of Patent: Sep. 2, 2025

(54) METHOD AND SYSTEM FOR CONTROLLING WATER SYSTEM FOULING

(71) Applicant: John V. Kraft, Bryan, TX (US)

(72) Inventor: John V. Kraft, Bryan, TX (US)

(*) Notice: Subject to any disclaimer, the term of this patent is extended or adjusted under 35 U.S.C. 154(b) by 781 days.

(21) Appl. No.: 17/642,584

(22) PCT Filed: Sep. 11, 2020

(86) PCT No.: PCT/US2020/050387
§ 371 (c)(1),
(2) Date: Mar. 11, 2022

(87) PCT Pub. No.: WO2021/050863
PCT Pub. Date: Mar. 18, 2021

(65) Prior Publication Data
US 2022/0340454 A1    Oct. 27, 2022

Related U.S. Application Data

(60) Provisional application No. 62/899,863, filed on Sep. 13, 2019.

(51) Int. Cl.
*C02F 1/46* (2023.01)
*C02F 1/32* (2023.01)

(52) U.S. Cl.
CPC .............. *C02F 1/4606* (2013.01); *C02F 1/32* (2013.01); *C02F 2303/20* (2013.01)

(58) Field of Classification Search
CPC ....... C02F 1/4606; C02F 1/32; C02F 2303/20
See application file for complete search history.

(56) References Cited

U.S. PATENT DOCUMENTS

| 6,800,207 B2 | 10/2004 | Holt et al. |
| 6,852,236 B2 | 2/2005 | Holt et al. |
| 7,122,115 B2 * | 10/2006 | Holt ........................ C02F 1/325 |
| | | 210/205 |
| 2011/0215055 A1 | 9/2011 | Baron |

FOREIGN PATENT DOCUMENTS

WO    WO-2014085690 A1 *  6/2014 ............ B01F 3/2292

OTHER PUBLICATIONS

Search Report & Written Opinion for PCT Patent Application No. PCT/US2020/050387, "Method and System for Controlling Water System Fouling" dated Dec. 3, 2020, 13 pages filed herewith.

* cited by examiner

*Primary Examiner* — Youngsul Jeong
(74) *Attorney, Agent, or Firm* — Amundsen Davis, LLC

(57) ABSTRACT

A system in which water flowing through the system flows in proximity to an ion generation device and to a UV radiation source combines silver photochemistry principles, heavy metal toxicity, and UV radiation to form a highly effective combined water disinfection process. Using ion generation and UV irradiation, the system synergistically improves the disinfection and bactericidal effects of ion generation or UV radiation working individually by making ion-exposed microorganisms more susceptible and less resistant to the bactericidal effects of UV radiation. The UV radiation source uses a manual wiping system to remove buildup that is a result of water supply minerals attaching to quartz sleeves used within the UV radiation source. The present invention introduces a device or other obstructive structure that creates a flow pattern that provides additional "wiping" of the quartz sleeves on a continual basis in conjunction with manual wiping.

4 Claims, 4 Drawing Sheets

METHOD AND SYSTEM FOR CONTROLLING WATER SYSTEM FOULING

This application claims the benefit and priority of U.S. Provisional Patent No. 62/899,863 filed Sep. 13, 2019.

FIELD OF THE INVENTION

This invention relates generally to methods and devices used with water systems. More particularly, it relates to a method and system for exposing water, flowing through the water system, to the synergistic combination of an ion generator and a source of ultraviolet radiation whereby the exposed water and its contents are irradiated by the ultraviolet light and metallic ions are fed into the water flow to prevent fouling of the water system by algae, nuisance invertebrates, microorganisms, and inorganic salts. This invention also specifically relates to an enhanced method and system that utilizes the ion and ultraviolet radiation generating devices of this inventor's prior inventions, as disclosed and claimed in U.S. Pat. Nos. 6,350,385; 6,800,207; 6,852,236; and 7,122,115.

BACKGROUND OF THE INVENTION

Ultraviolet light (UV) radiation has long been considered a viable method for drinking water disinfection due to its ability to inactivate protozoa and other microbial species. UV of a given wavelength is absorbed by the cellular nucleotides of bacteria, viruses and other microorganisms and causes cross-linking, or demerization, of their RNA and DNA, thereby destroying their ability to multiply and thereby effectively disinfecting the water. Further, UV light radiation does not create significant disinfection by-products. However, due to the cost that is directly proportional to power requirements, UV disinfection can be very expensive to implement. Power requirements for UV disinfection depend primarily on the required fluence, or the product of irradiance and exposure time.

Ion generators have also been employed in previous attempts to control algae, nuisance invertebrates, and microorganisms. Such ion generators are based on well-known principles of electrochemical reactions, one of which is referred to as electrolysis. Electrolysis is an electrochemical process by which electrical energy is used to promote chemical reactions that occur on the surface of functionally cooperating electrodes. One electrode, called the anode, involves the oxidation process where chemical species lose electrons. A second electrode, called the cathode, involves the reduction process where electrons are gained. In water, for example, oxygen is generated at the anode and hydrogen is generated at the cathode. The generation of hydrogen and oxygen in fresh water by the process of electrolysis will be weak due to the low electrical conductivity of the water. The oxygen generated aids in the prevention of the deposit of inorganic salts on the electrodes. The function of an ion generator is also to produce metal ions, typically copper ions or silver ions. Metal ion production is accomplished by use of an electrically charged metal anode that comprises atoms of the metal ions that are to be generated. It is the purpose of the ion generator to feed the metal ions out of the generator before they can be deposited on a cathode. The metal ions and oxygen, both of which are produced by the ion generator, are feed into the water stream of the water system to prevent fouling of the system by algae, nuisance invertebrates, microorganisms, and inorganic salts.

The toxicity of copper and silver to aquatic organisms is well established although the exact mechanism is not well defined. The bactericidal effects of silver, for example, have been known for centuries. Silver has been shown to be effective as a disinfectant against coliforms and viruses, including human adenoviruses, as well as other microbial species. In general, these heavy metals must be in an ionic form in order for them to be toxic to invertebrates, microorganisms and algae. The eradication of microorganisms is attributed to positively charged ions that are both surface active and microbiocidal. These ions attach themselves to the negatively charged bacterial cell wall of the microorganism and destroy cell wall permeability. This action, coupled with protein de-naturation, induces cell lysis and eventual death. One advantage to the use of metal ionization, for example, is that eradication efficacy is wholly unaffected by water temperature. Chlorine, a commonly used antifouling chemical, is somewhat temperature dependent. Furthermore, the metal ions actually kill the microorganisms, and other microorganism-promoting bacteria and protozoa, rather than merely suppress them, as in the case of chlorine. This minimizes the possibility of later re-colonization. Other advantages of metal ionization compared to other eradication techniques include relatively low cost, straightforward installation, easy maintenance, and the presence of residual disinfectant throughout the system. In water, and at concentrations sufficient for bactericidal activity, silver does not impart taste, color or odor and has no apparent detrimental effects on mammalian cells. Accordingly, the United States Environmental Protection Agency (USEPA) does not set a primary drinking water standard for silver.

The photochemistry of silver salts, or silver compounds, is also well known. When silver salts are exposed to light, silver ions and free electrons are generated which, in turn, combine to form silver atoms. The silver atoms produce the "latent image" which is enhanced through the development process.

In the view of this inventor, what is needed is an improved ion generating and UV generating disinfection system that uniquely combines silver photochemistry principles, heavy metal toxicity, and UV light radiation to form a highly effective combined water disinfection method and system. Such a combination would be highly lethal to a broad range of microbial organisms, including viruses, because it would synergistically improve the disinfection or bactericidal effects of ion generation or UV radiation working individually. This synergism occurs because, for example, silver ions complex with the DNA of microorganisms, making them even more susceptible and less resistant to the bactericidal effects of UV radiation. Such a combined method and system would, in effect, work to immediately kill most of the microorganisms and then cause a residual killing mechanism to greatly enhance the water disinfection process. In the view of this inventor, what is needed is such an improved method and system whereby the system can be configured for single pass through, dual pass through or for recirculation such that the order of exposure to the ion generation and UV radiation aspects can be varied, altered, or combined as desired or required by any particular application. What is also needed is such an improved method and system that includes means for controlling ion concentration and UV fluence levels to maximize performance, to minimize energy consumption, and, in some situations, to selectively target certain microorganisms for inactivation.

SUMMARY OF THE INVENTION

It is, therefore, a principal object of this invention to provide an improved method and system for exposing the water flow within a water system to an ion generation device and to a source of UV radiation that combines silver photochemistry principles, heavy metal toxicity, and UV light radiation to form a highly effective combined water disinfection process. It is another object of this invention to provide such an improved method and system whereby the combination is highly lethal to a broad range of microbial organisms, including viruses. It is still another object of the present invention to provide such an improved method and system that synergistically improves the disinfection or bactericidal effects of ion generation or UV radiation working individually by making ion-exposed microorganisms more susceptible and less resistant to the bactericidal effects of UV radiation. It is yet another object of the present invention to provide such an improved combined method and system whereby immediate killing of most of the microorganisms occurs and then residual killing follows as to other microorganisms to greatly enhance the water disinfection process. It is still another object of the present invention to provide such an improved method and system whereby the system can be configured for single pass through or for recirculation such that the order of exposure to the ion generation and UV radiation aspects can be varied or altered as desired or required by any particular application. It is yet another object of the present invention to provide such an improved method and system whereby means are provided for controlling ion concentration and UV fluence levels to maximize performance, to minimize energy consumption, and, in some situations, to selectively target certain microorganisms for inactivation. It is still another object of the present invention to provide such an improved method and system whereby means is provided for reducing maintenance of the system and for improving the radiation transmittance of the UV radiation source.

The present invention has obtained these objects. It provides an improved method and system in which water flowing through a water system flows in proximity to an ion generation device and to a source of UV radiation that combines silver photochemistry principles, heavy metal toxicity, and UV light radiation to form a highly effective combined water disinfection process. Using ion generation and UV irradiation, the improved method and system synergistically improves the disinfection and bactericidal effects of ion generation or UV radiation working individually by making ion-exposed microorganisms more susceptible and less resistant to the bactericidal effects of UV radiation. The combined method and system of the present invention may include control means such that the method and system can be configured for single pass through, multiple pass through, or for recirculation such that the order of exposure to the ion generation and UV radiation aspects can be varied or altered. The improved method and system of the present invention may also be provided with means for controlling ion generation and UV fluence levels to maximize performance, to minimize energy consumption, and, in some situations, to selectively target certain microorganisms for inactivation.

The foregoing and other features of the improved method and system of the present invention will be apparent from the detailed description that follows.

DETAILED DESCRIPTION

Figure 1:
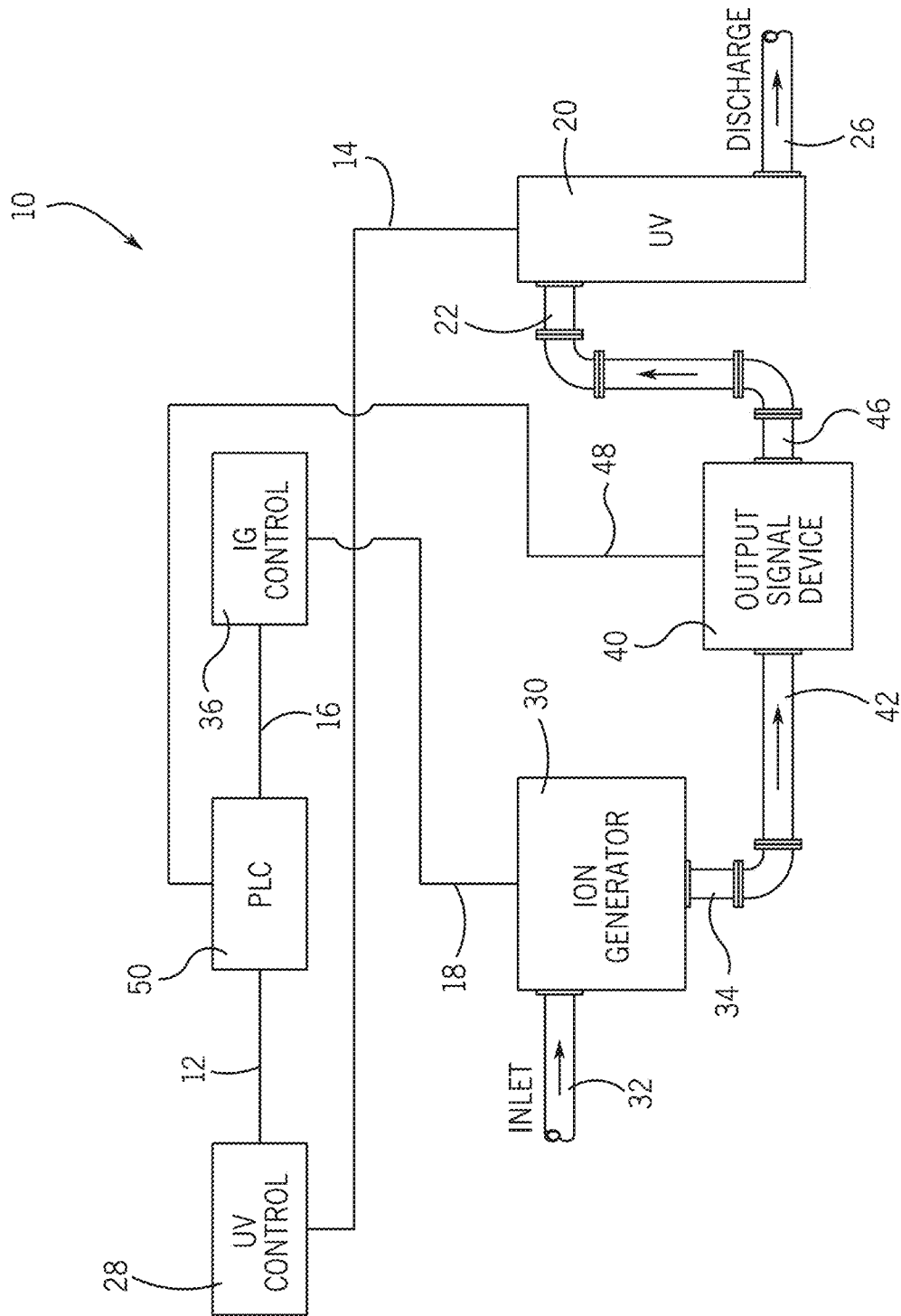
FIG. 1 is a schematic diagram illustrating a combined ion generating and UV generating disinfection system configured in a one pass system in accordance with the present invention.

Referring now to the drawing in detail, FIG. 1 illustrates a schematic diagram of a first preferred embodiment of a system, generally identified 10, that utilizes the method of the present invention. As shown, the system 10 includes the essential components of a UV disinfection unit 20 and a silver ion generator 30, the components being configured in a one pass system 10. That is, water flowing through the system 10 passes through the system 10 and each of its essential components 20, only once. The UV disinfection unit 20 and the silver ion generator 30 form part of a water flow continuum. More specifically, the UV disinfection unit 20 is configured for attachment to a water inlet line 22 and to an output line 26, which is also the system discharge line. The water inlet line 22 will be discussed in further detail later in this detailed description. The ion generator 30 is similarly configured for attachment to a water inlet line 32 and to an output line 34, the inlet line 32 also being the system inlet line. The output line 34 of the ion generator 30 is functionally attached to the inlet line 22 of the UV disinfection unit 20. As shown, the UV disinfection unit 20 is downstream from the ion generator 30. However, such is not a limitation of the present invention. The system 10 could be alternatively configured to place the ion generator 30 downstream from the UV disinfection unit 20 without deviating from the scope of the present invention. Interposed between the ion generator 30 and the UV disinfection unit 20 is an output signal device 40, the significance of which will be apparent later in this detailed description.

The UV disinfection unit 20 of the present invention is of a type that uses a special low-pressure mercury vapor lamp. Preferably, the lamp is mounted out of the water or is housed in a UV-transparent sleeve that is located inside a water flow chamber, the lamp not being in direct contact with the water. One or more lamp and sleeve arrays may be used. Water passing through the unit 20 is directly exposed to the UV radiation that is emitted by the lamp. The water flow chamber can be a cylindrical or other shaped aluminum or stainless-steel shell having a highly polished inner surface such that UV light is reflected off the inner surface and back into the water flow in a mirror-like fashion. In this way, the UV radiation is dissipated almost entirely within the water because all reflections are near loss-less of the total internal reflectivity of the shell. In order to "kill" microorganisms, the UV radiation must actually strike the cell. Accordingly, certain water contaminants can somewhat reduce the transmissivity of UV radiation within the shell and, ultimately, the amount of UV radiation that reaches the bacteria or virus sought to be irradiated. Additionally, suspended particles may result in partially "shielding" certain microorganisms that are buried within the particles, thus passing those microorganisms through the shell unaffected by the UV radiation. It is generally recognized that the germicidal wavelength of UV radiation is between 100 and 300 nanometers, which lies between visible light and x-rays on the electromagnetic wavelength spectrum. The optimal UV wavelength for disinfection is 254 nanometers which is the mercury resonance line of most commercially-available short-wave low-pressure mercury vapor tubes. It is to be understood, however, that the precise configuration of the shell, and of the UV light tube or tubes within the shell, is not a limitation of the present invention. Various configurations could be used without deviating from the scope of the claims that follow.

As mentioned above, the UV disinfection unit 20 of the present invention is preferably of a type that uses at least one special low-pressure mercury vapor lamps, which lamps are mounted out of the water or are housed in a UV-transparent sleeve (such as a quartz sleeve) that is located inside a water flow chamber, the lamp not being in direct contact with the water. However, water passing through the unit 20 is directly exposed to the UV radiation that is emitted by each lamp. Where the UV disinfection unit 20 is configured as a tubular unit, the unit includes a removable front head and a manual wiping system in the form of a plunger-style wiping structure having wiper rings, one about the circumference of each UV-transparent sleeve. In such a configuration, the manual wiping system allows the user to simply push the wiper back and forth across the arc lengths of the UV-transparent sleeves. The wiper rings serve to remove buildup from the UV-transparent sleeve. This buildup is the result of water supply minerals that attach to the quartz sleeves. In typical use, the wiping system is used on a weekly basis.

Figure 4:
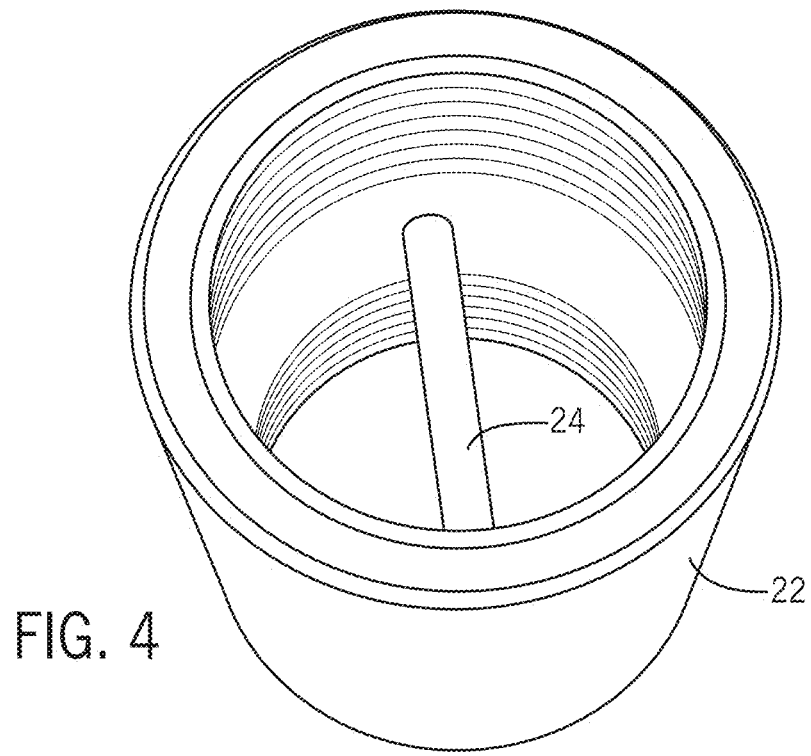
FIG. 4 is a perspective view of the device in accordance with the present invention that is a water inlet line to the UV disinfection unit.
Figure 5:
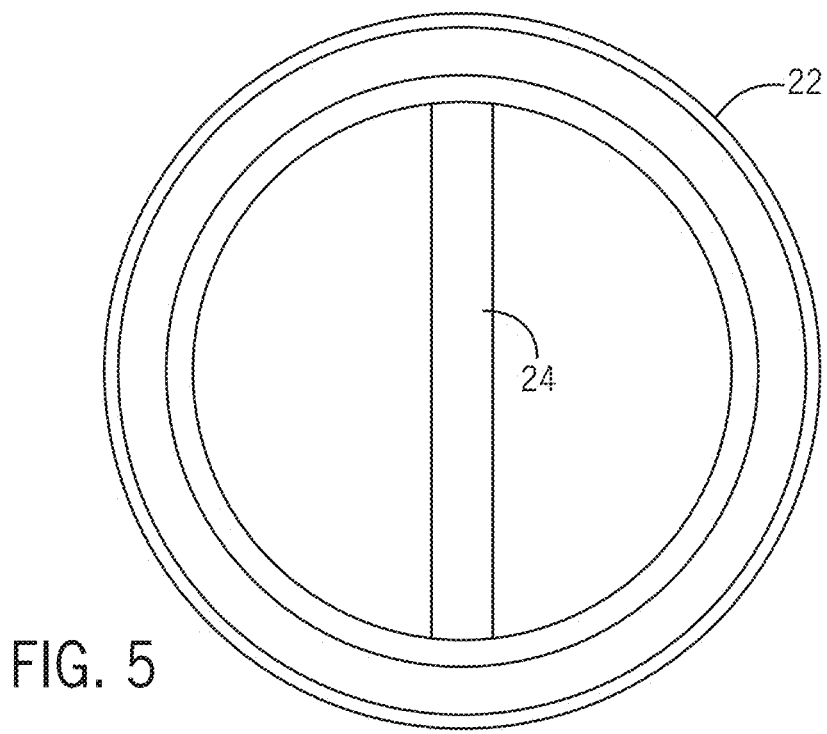
FIG. 5 is an end elevation view of the device illustrated in FIG. 4.

The present invention introduces a device or other obstructive structure that creates a flow pattern that provides additional "wiping" of the quartz sleeves on a continual basis in conjunction with manual wiping. One example of the obstructive structure is included with the improved method and system is of the type shown in FIGS. 4 and 5. As shown, the water inlet line is a cylindrical sleeve 22 that comprises a cylindrical rod 24 as the obstructive structure that is disposed transversely within the sleeve 22. It is to be understood that the rod 24 could be configured other than as a cylinder and other than as a rod. Accordingly, the specific shape of the rod 24 is not a limitation of the present invention, nor is the precise placement of the obstructive structure 24 within the sleeve 22. The sleeve 22 could also comprise one portion of the UV inlet, used in conjunction with one or more other inlet line elements. The rod 24 is an obstructive structure that creates a flow pattern that induces or imparts turbulence to the water flow within the UV disinfection unit 20. This turbulence reduces the amount of water-borne material that attaches to the quartz sleeves. This, in turn, improves the efficacy of the UV radiation transmittance within the UV disinfection unit 20 during normal usage.

Figure 2:
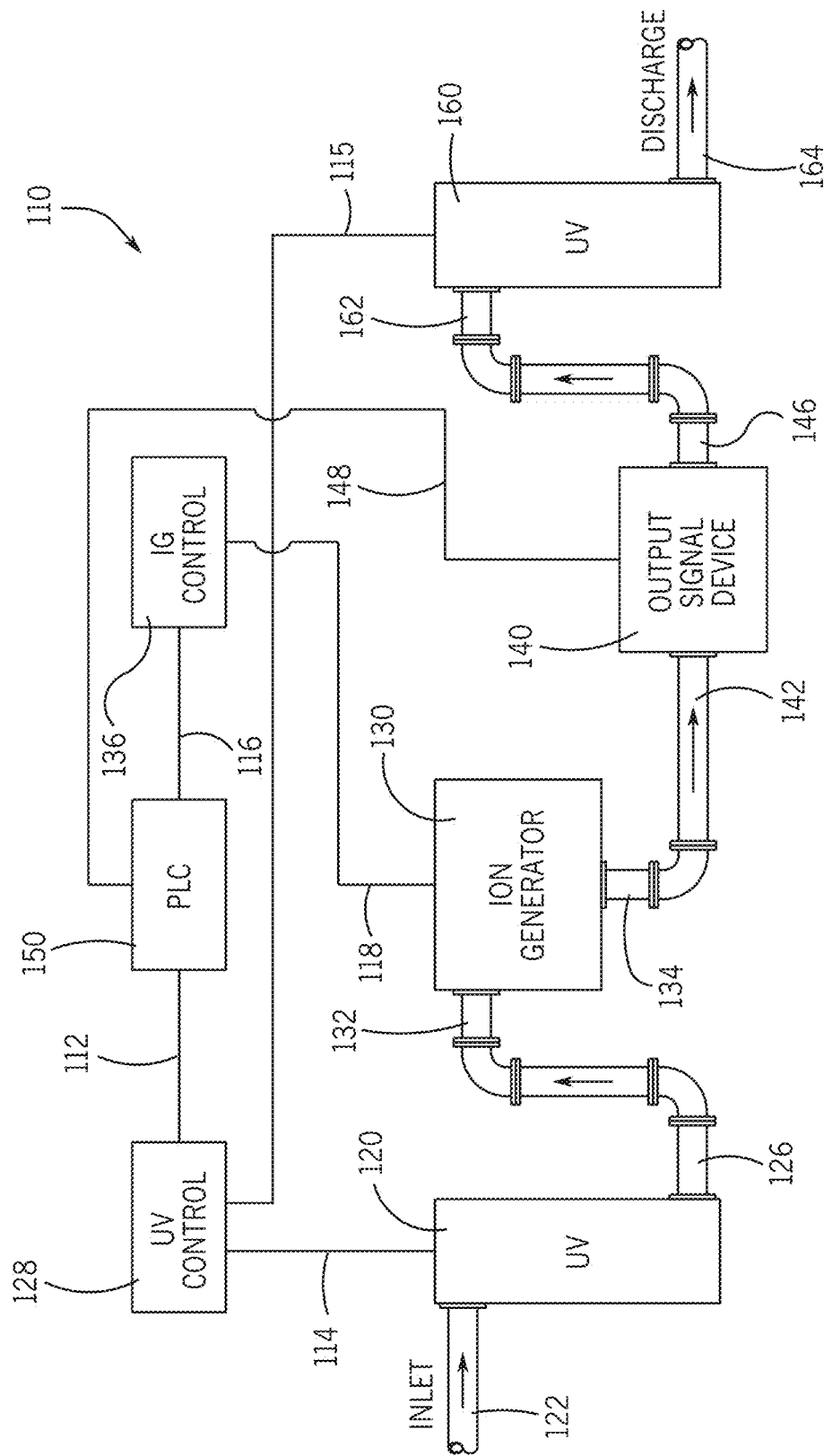
FIG. 2 is a schematic diagram illustrating a combined ion generating and UV generating disinfection system configured in a dual one pass system in accordance with the present invention.
Figure 3:
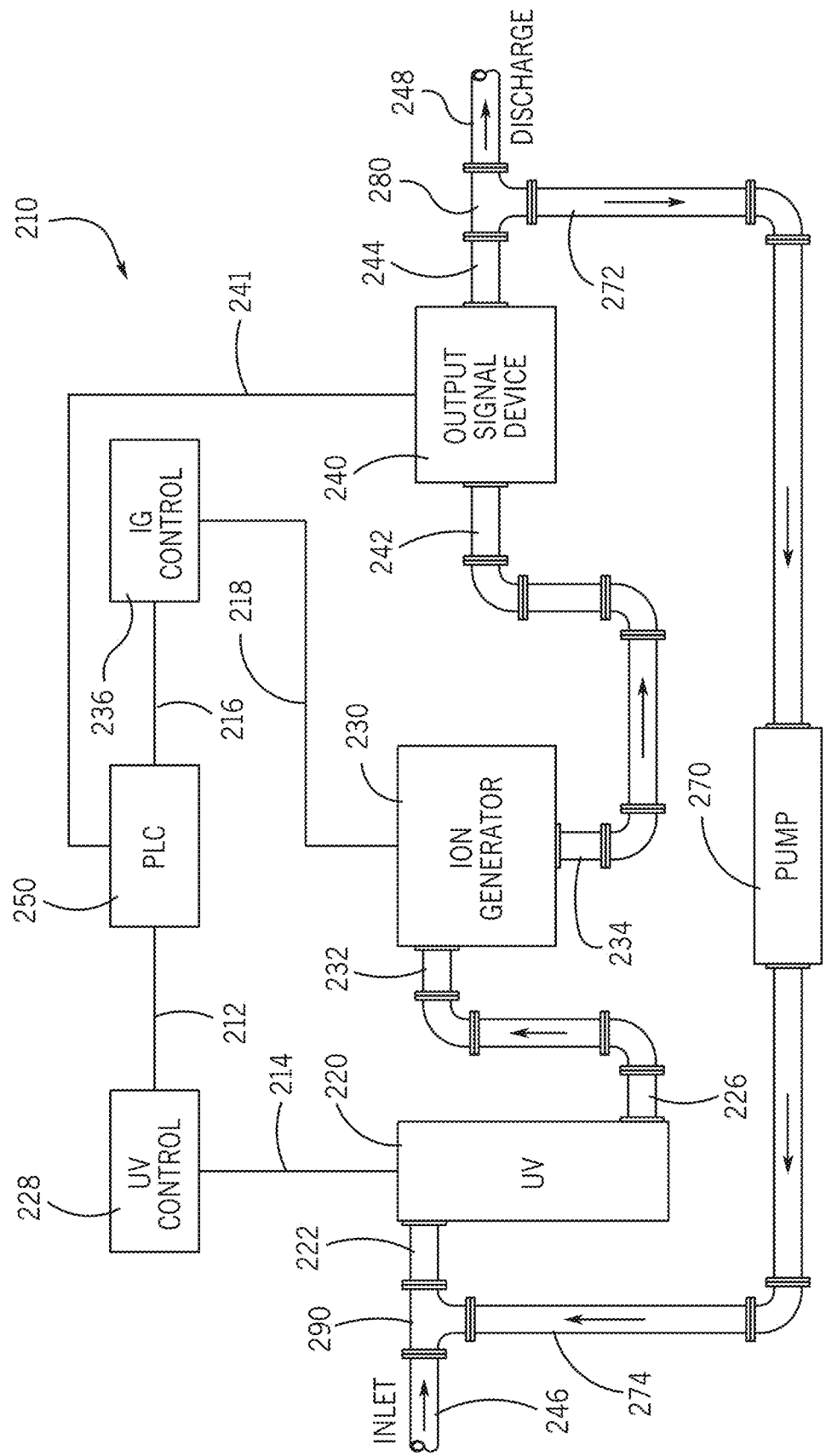
FIG. 3 is a schematic diagram illustrating a combined ion generating and UV generating disinfection system configured in a recirculating system in accordance with the present invention.

Lastly, it is to be noted that the inlet line 22 is machined with internal threads for securement of the line 22 to the UV disinfection unit 20 and the piping leading from the ion generator 30. Depending on the configuration, the inlet line 22 could also be externally threaded or flanged, as is suggested in FIG. 1. In FIGS. 2 and 3, the inlet lines 122, 162, 222, respectively, could be alternatively configured as well. Irrespective of the precise configuration, the inlet lines and corresponding rod 24 or other obstructive structure disposed in each is used for the same purpose, which is the creation of a flow pattern that induces or imparts turbulence to the water flow within each of the UV disinfection units 20, 120, 160 disclosed herein.

The ion generator 30 of the present invention is of the type more specifically described in U.S. Pat. Nos. 6,350,385; 6,800,207; 6,852,236; and 7,122,115, each of which is incorporated herein by reference, and generally includes a containment tank that is cylindrical in physical configuration. Attachable to the tank is a tank cover or lid preferably constructed of a special polymer plastic material that provides strength, durability and electrical non-conductivity. Attached to the underside of the lid are a number of functionally cooperating electrodes, including at least one anode and at least one cathode. It is to be understood that the number of such electrodes is not a functional limitation of the present invention. Other combinations could be provided, such as two anodes and two cathodes, and so on, without deviating from the scope of the present invention. The anode and the cathode are each fabricated in the shape of a rectangular prism. In the preferred embodiment of the system 10 of the present invention, the anode is made of silver as is the cathode. Again, the material from which each of the electrodes is made is not a limitation of the present invention, other than that the material used must enable the process of electrolysis. An electrical potential is applied across at least one anode and at least one cathode and providing electronic circuitry for providing periodic polarity reversal between said at least one anode and said at least one cathode. In the preferred embodiment, a power supply on the order of several hundred watts may be applied to achieve the electrochemical process of electrolysis across the electrodes.

The anode and the cathode are placed in parallel planar relation to one another. In this parallel planar relation, the plane defined by each electrode is substantially parallel to the axis of the inlet line 32. The inlet line 32 is generally perpendicular to the axis of the tank of the ion generator 30. The tank and the inlet line 32 are functionally cooperative to allow water to flow into the tank interior in a whirlpool-like or double vortex flow. In this fashion, water enters the tank and is directed to forcibly flow between the electrodes. Upon exiting the area between the electrodes, the water follows an annular wall surface in a whirlpool-like or turbulent double vortex-type fashion. That is, the water flow is effectively "split" at that portion of the wall surface immediately opposite the inlet and continues in two opposite directions back around the electrodes and along the wall surface. This double vortex turbulence facilitates the electrolysis process and the migration of silver ions away from the anode and away from the cathode before the ions have a chance to attach themselves to the cathode thus defeating the purpose of ionic water treatment. The water ionization serves to control algae, nuisance invertebrates, microorganisms and inorganic salts lurking in other parts of the water system 10 within which the ion generator 30 is incorporated. As the electrolysis process continues, an electronic polarity reverser cycles at reversing rates deemed appropriate for a specific site operation. Gradually, the anode effectively becomes used up as ions are given up to the water flow. The containment tank also includes a sight glass defined within the wall of the tank, the purpose of which is to provide visual access to the tank interior. The sight glass allows the user to view the containment tank interior to determine if anode wastage has occurred to the point that the anode must be replaced.

In the first preferred embodiment shown in FIG. 1, the UV disinfection unit 20 is electronically coupled 14 to, and its operation is controlled by, a UV controller 28. Similarly, the ion generator 30 is electronically coupled 18 to, and its operation is controlled by, an ion generator (IG) controller 36. The UV controller 28 and the IG controller 36 are each electronically coupled 12, 16, respectively, to a programmable logic controller (PLC) 50. Alternatively, the PLC 50 may include the controllers 28, 36 as part of its integrated circuitry. The system 10 also includes an output signal device 40, as previously mentioned, the output signal device 40 being electronically coupled 48 to the PLC 50. The output device 40 provides a signal to the PLC 50 based on flow rate. The PLC 50 is electronically coupled 12, 16 to controllers 28, 36. Controllers 28, 36 are electronically coupled 14, 18 to UV disinfection unit 20 and ion generator 30, respectively. Controllers 28, 36 adjust UV fluence 20 and ion concentration generation 30 based on flow demand. The output device 40 further includes an inlet line 42, the inlet line 42 being coupled to the output line 34 of the ion generator 30, and an output line 46, the output line 46 being coupled to the inlet line 22 of the UV disinfection unit 20.

In application, water flows into the system 10 by means of the first inlet line 32 to the ion generator 30. The water is treated by ionic discharge as it passes through the unit 30. The treated water is discharged at the output line 34 of the ion generator 30 and flows through the inlet line 22 of UV disinfection unit 20 wherein a flow pattern is created that induces or imparts turbulence to the water flow within the UV disinfection unit 20. The water is then treated by UV radiation as it passes through this UV disinfection unit 20. The output signal device 40 may be used to control ion generation and UV fluence levels to maximize performance, to minimize energy consumption, and, in some situations, to selectively target certain microorganisms for inactivation. In short, any number of system parameters may be monitored and controlled by use of the output signal device 40 in combination with the PLC 50. During this process, it is also to be understood that a pre-programmed scheme exists within the PLC 50 for operating the controllers 28, 36 and the UV disinfection unit 20 and the ion generator 30, respectively, as is desired or required. It is also to be understood that the configuration of the preferred embodiment of the system 10 could be altered to place the UV disinfection unit 20 upstream from the ion generator 30 without deviating from the scope of this invention.

Referring now to FIG. 2, it illustrates a schematic diagram of a second preferred embodiment of a system, generally identified 110, that also utilizes the method of the present invention. As shown, the system 110 includes the essential components of a first UV disinfection unit 120, a second UV disinfection unit 160 and a silver ion generator 130, the components being configured in a dual one pass system 110. That is, water flowing through the system 110 passes through the system 110 and the one ion generator 130, but through two UV disinfection units 120, 160. The UV disinfection units 120, 160 and the silver ion generator 130 form part of the water flow continuum. As shown, the first UV disinfection unit 120 is configured for attachment to a water inlet line 122, or water inlet, and to an output line 126. The second UV disinfection unit 160 is attached to a water inlet line 162 and a water output line 164, which is also the system discharge line. Each UV disinfection unit inlet line 122, 162 comprises an obstructive structure that induces or imparts turbulence to the water flow within each of the UV disinfection units 120, 160, respectively. The ion generator 130 is similarly configured for attachment to a water inlet line 132 and to an output line 134, the inlet line 132 being attachable to the output line 126 of the first UV disinfection unit 120 and the output line 134 being attachable to the inlet line 162 of the second UV disinfection unit 160. As shown, the first UV disinfection unit 120 is upstream from the ion generator 130 and the second UV disinfection unit 160 is downstream from it. Interposed between the ion generator 130 and the second UV disinfection unit 160 is an output signal device 140 having a water inlet line 142 and an outlet line 144. In application, the operation of this alternative embodiment system 110 is essentially the same at that described above for the first system 10 with the exception that the UV controller 128 is coupled 114, 115 to each of the UV disinfection units 120, 160, respectively. The ion generator 130 is coupled 118 to the IG controller 136 and the PLC 150 is coupled 112, 116 to each of the controllers 128, 136, respectively. Any number of system parameters may be monitored and controlled by use of the output signal device 140 in combination with the PLC 150. During this process, it is also to be understood that a pre-programmed scheme exists within the PLC 150 for operating the controllers 128, 136 and the UV disinfection units 120, 160 and the ion generator 130, respectively, as is desired or required.

FIG. 3 illustrates yet another schematic diagram of a third preferred embodiment of a system, generally identified 210, that similarly utilizes the method of the present invention. As shown, the system 210 includes the essential components of a UV disinfection unit 220 and a silver ion generator 230, the components being configured in a re-circulating system 210. That is, water flowing through the system 210 passes through the system 210 and the essential components 220, 230, but may also be re-circulated from the system discharge and back to the system inlet 222 by means of a re-circulation pump 270. In this system 210, the UV disinfection unit 220, the silver ion generator 230, and the pump 270, each form part of the water flow continuum. As shown, the UV disinfection unit 220 is configured for attachment to a water inlet line 222, whereby a flow pattern is created that induces or imparts turbulence to the water flow within the UV disinfection unit 220, and to an output line 226. The UV disinfection unit 220 is coupled 214 to a UV controller 228. Similarly, the ion generator 230 is coupled 218 to an IG controller 236. The ion generator 230 is configured for attachment to a water inlet line 232 and to an output line 234, the inlet line 232 being attachable to the output line 226 of the UV disinfection unit 220 and the output line 234 being attachable to the inlet line 242 of an output signal device 240. The output signal device 240 also includes an outlet line 244 that is connected to a first "T" section 280 which, in turn, is connected to the discharge line 248 of the system 210 and to the inlet line 272 of the pump 270. A second "T" section 290 is connected to the outlet line 274 of the pump 270 and to the inlet line 222 of the UV disinfection unit 220. The second "T" section 290 is also connected to the system water inlet 246. The application of this alternative embodiment system 210 is also essentially the same at that described above for the first system 10 and the second system 110 with the exception that the pump 270 is introduced into the system 210 for the purpose of re-circulating water through the system 210 if such is desired or required. As was true with the first and second embodied systems 10, 110, any number of system parameters may be monitored and controlled by use of the output signal device 240 in combination with the PLC 250, the PLC 250 being coupled electronically 212, 216, 241 to the UV controller 228, the IG controller 236 and the output signal device 240, respectively. During this process, it is also to be understood that a pre-programmed scheme exists within the PLC 250 for operating the controllers 228, 236 and the UV disinfection unit 220 and the ion generator 230, respectively, as is desired or required.

From the foregoing description of the illustrative embodiments of the invention set forth herein, it will be apparent that there has been provided a new and useful method and system in which water flowing through a water system flows in proximity to an ion generation device and to a source of UV radiation that combines silver photochemistry principles, heavy metal toxicity, and UV light radiation to form a highly effective combined water disinfection process. Using ion generation and UV irradiation, the method and system of the present invention synergistically improves the disinfection and bactericidal effects of ion generation or UV radiation working individually by making ion-exposed microorganisms more susceptible and less resistant to the bactericidal effects of UV radiation. The combined method and system of the present invention may include control means such that the method and system can be configured for single pass through, dual pass through or for recirculation such that the order of exposure to the ion generation and UV radiation aspects can be varied or altered. The method and system of the present invention may also be provided with means for controlling ion generation and UV radiation levels to maximize performance, to minimize energy consumption, and, in some situations, to selectively target certain microorganisms for inactivation.

The invention claimed is:

1. A water treatment system comprising:
    an ion generator for applying metallic ions to the water having an inlet line and an output line;
    an output signal device for providing a signal based upon a flow rate of water passing through the output signal device, the output signal device having an input line and an output line, wherein the input line of the output signal device is connected to the output line of the ion generator;
    an ultraviolet (UV) disinfection unit for applying ultraviolet radiation to the water having an input line and an output line, wherein the input line of the ultraviolet disinfection unit is connected to the output line of the output signal device and wherein the input line to the ultraviolet disinfection unit further comprises an obstructive structure disposed therein;
    an ion generator controller electronically coupled to the ion generator for controlling the ion generator;
    an ultraviolet disinfection unit controller electronically coupled to the ultraviolet disinfection unit;
    a programmable logic controller electronically coupled to the output signal device and the ion generator controller and the ultraviolet light disinfection unit controller, whereby the programmable logic controller controls the ion generator controller and the ultraviolet disinfection unit controller in response to signal provided by the output signal device;
    wherein the input line to the ultraviolet disinfection unit further comprises a cylindrical sleeve and the obstructive structure comprises a rod that is disposed transversely within the cylindrical sleeve; and
    wherein the obstructive structure disposed within the input line cylindrical sleeve of the ultraviolet disinfection unit further comprises a rod that is disposed transversely within the input line cylindrical sleeve;
    the ultraviolet disinfection unit further comprises at least one UV light tube having a quartz sleeve that prevents water from directly contacting the UV light tube; and
    the rod imparts to the water entering the ultraviolet disinfection unit a wiping action of the quartz sleeve on a continual basis and improves the efficacy of the UV radiation transmittance inside the ultraviolet disinfection unit.

2. The water treatment system of claim 1, wherein the obstructive structure is configured to create a water flow pattern that imparts turbulence to the water flow upon entry of the water into the ultraviolet disinfection unit.

3. A water treatment system comprising:
    an ultraviolet (UV) disinfection unit for applying ultraviolet radiation to the water having an input line and an output line, the input line comprising an obstructive structure;
    an ion generator for applying metallic ions to the water having an input line and an output line, wherein the input line of the ion generator is connected to the output line of the ultraviolet disinfection unit;
    an output signal device for providing a signal based upon a flow rate of water passing through the output signal device, the output signal device having an input line and an output line, wherein the input line of the output signal device is connected to the output line of the ion generator;
    an ion generator controller electronically coupled to the ion generator for controlling the ion generator;
    an ultraviolet disinfection unit controller electronically coupled to the ultraviolet disinfection unit; and
    a programmable logic controller electronically coupled to the output signal device and the ion generator controller and the ultraviolet light disinfection unit controller, whereby the programmable logic controller controls the ion generator controller and the ultraviolet disinfection unit controller in response to signal provided by the output signal device;
    wherein the input line to the ultraviolet disinfection unit further comprises a sleeve, the obstructive structure disposed within the input line sleeve of the ultraviolet disinfection unit further comprises a rod that is disposed transversely within the input line sleeve;
    wherein the ultraviolet disinfection unit further comprises at least one UV light tube having a quartz sleeve that prevents water from directly contacting the UV light tube; and
    wherein the rod imparts to the water entering the ultraviolet disinfection unit a wiping action of the quartz sleeve on a continual basis and improves the efficacy of the UV radiation transmittance inside the ultraviolet disinfection unit.

4. The water treatment system of claim 3, wherein the obstructive structure is configured to create a water flow pattern that imparts turbulence to the water flow within the ultraviolet disinfection unit.

* * * * *